Jan. 2, 1934.  O. R. WIKANDER  1,941,521
FRICTION SPRING DEVICE
Filed July 7, 1930  2 Sheets-Sheet 1
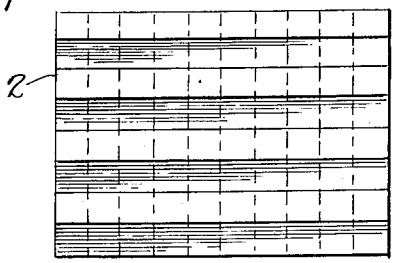
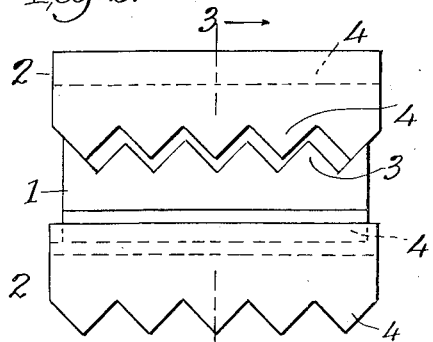
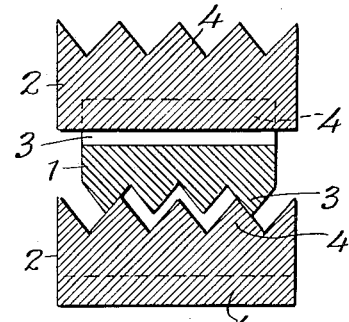
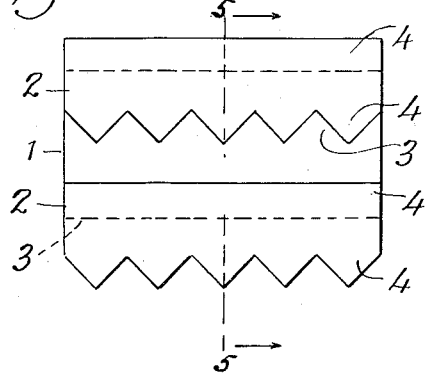
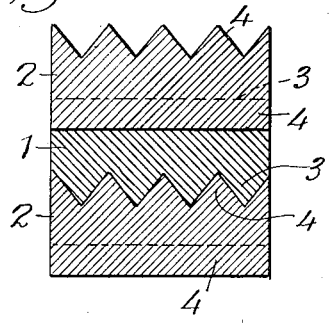
Inventor:
Oscar R. Wikander,
By Paul E. Schilling,
Attorney.

Jan. 2, 1934.  O. R. WIKANDER  1,941,521
FRICTION SPRING DEVICE
Filed July 7, 1930  2 Sheets-Sheet 2
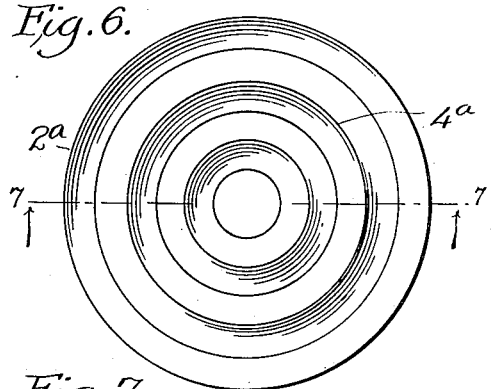
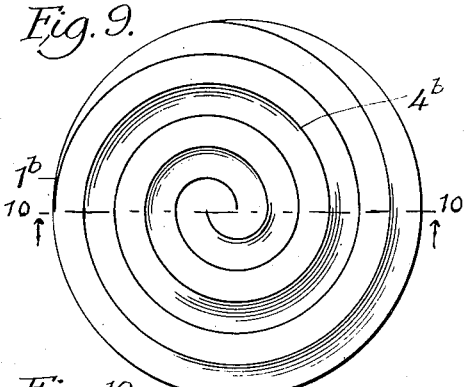
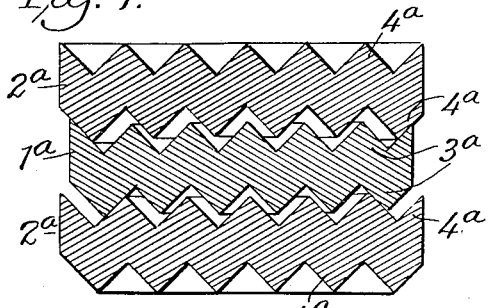
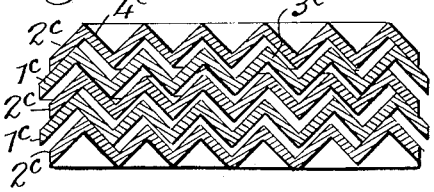
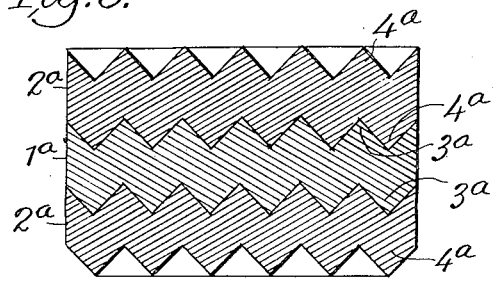
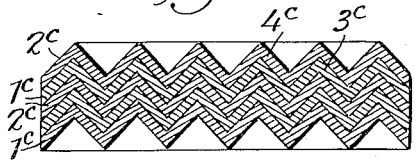
Inventor:
Oscar R. Wikander,
By Paul E. Schilling,
Attorney.

Patented Jan. 2, 1934

1,941,521

UNITED STATES PATENT OFFICE 1,941,521

FRICTION SPRING DEVICE

Oscar R. Wikander, Pittsburgh, Pa., assignor to Edgewater Steel Company, Pittsburgh, Pa.

Application July 7, 1930. Serial No. 466,306

10 Claims. (Cl. 267—1)

The various types of springs known at present operate either mainly under bending stresses, mainly under torsion stresses, or mainly under tensile and compressive stresses.

The spring, which is the subject of the present invention, relates to that class which operate mainly under tensile and compressive stresses.

Springs of this type have heretofore been constructed with annular elements telescoping into each other, the alternatingly individual elements being subjected to tensile and compressive stresses in the circumferential direction only.

In a prior application I have disclosed a spring construction in which superimposed circular plates, instead of annular elements, are alternatingly subjected to tensile and compressive stresses, in the circumferential direction only. In another prior application I have disclosed a spring construction in which superimposed plates are alternatingly subjected to tensile and compressive stresses in one straight line direction.

All of the above constructions subject the individual spring elements of a spring stack alternatingly to tensile and compressive stresses, each individual element being subjected either to tensile or compression stresses in one direction only.

The spring construction constituting the subject-matter of the present invention embodies a stack of superimposed plates, but differs from prior constructions in the respect that the plate shaped elements are subjected to duo-directional stresses, each plate element being subjected to a tensile or compressive stress in one direction, straight line, circumferential, or radial, depending on the construction of the spring, and to a second stress, tensile or compressive, in a direction at right angles to the first-named stress.

The application of this new principle of spring construction makes it possible to store a considerably greater amount of spring energy in the same weight of spring material than has been heretofore possible.

The invention will be more fully set forth in the following description and claims, reference being made to the accompanying drawings, in which:—

Fig. is a plan view of a spring stack or spring element forming one embodiment of the invention.

Fig. 2 is a side view of a stack made in accordance with the construction shown in Fig. 1, and showing the spring elements in normal or relaxed condition.

Fig. 3 is a transverse section on line 3—3 of Fig. 2.

Fig. 4 is a view of the spring stack corresponding to Fig. 2, but showing the spring fully compressed.

Fig. 5 is a transverse section on the line 5—5 of Fig. 4.

Fig. 6 is a plan view showing another embodiment of the invention.

Fig. 7 is a sectional view on the line 7—7 of Fig. 6, showing the spring device thereof in its fully relaxed condition.

Fig. 8 is a view similar to Fig. 7, but showing the spring thereof in its fully compressed condition.

Fig. 9 is a plan view similar to Fig. 6 showing still another embodiment of the invention.

Fig. 10 is a sectional view on the line 10—10 of Fig. 9, showing the spring in its fully relaxed condition.

Fig. 11 is a view similar to Fig. 10, but showing the spring fully compressed.

Referring now more particularly to the drawings, and particularly to Figs. 1 to 5 thereof, the numeral 1 designates tension plates, and the numeral 2 compression plates, said plates being coactively arranged in a series or in stack form and in superposed relation to provide a cushioning spring, made of a desired number of such plates. The coacting plates 1 and 2 have corrugated surfaces, the corrugations in the embodiment shown consisting of prismatic ribs or ridges of V-shape or triangular cross-section, those on the compression plates having slightly larger pitch (or distance between corresponding points of adjacent ribs or ridges) than those of the tension plates, with the result that the centers or apices of the corrugations are out of alinement or out of register when the spring is in its relaxed condition, as shown in Figs. 2 and 3, only the terminal prismatic corrugations 3 of the tension plates 1 bearing on the coacting corrugations 4 of the compression plates 2. When the plates are pressed together by a force acting vertically to their planes, the tension plates will stretch and the compression plates will compress under the influence of the wedging action between the inclined faces of coacting corrugations until the corrugations all register when the spring is fully compressed, as shown in Figs. 4 and 5. Each spring element, as shown, consists of a plate corrugated in two directions, perpendicularly to each other, each plate having one side or face provided with a row of corrugations extending in one direction and an opposite side or face having a similar row of corrugations extending at right angles to the row first-named. Each corrugated surface of a plate, when forced against a surface of another plate of slightly different pitch of corrugation will be subjected to tensile or compression stress in a direction perpendicular to that of the prismatic ribs or ridges which forms the corrugation. If its corrugations are of larger pitch than the engaging corrugations of the coacting plate, the first plate will be subjected to compressive stresses and the second plate to tensile stresses. It will thus be seen that the corrugations on one side of each element can be designed so as to subject said element to either tensile or compressive stresses in the direction perpendicular to its prismatic corrugations.

Since, furthermore, each element has two sides, each with a different set of corrugations, perpendicular or at right angles to that on the opposite side, it is apparent that a spring of the construction shown in Figs. 1 to 5, inclusive, can be designed so as to subject each element of the spring stack or series to predetermined duo-directional stresses, tensile stresses in one direction and either tensile or compressive stresses in the direction perpendicular thereto, whereby a considerably greater amount of spring energy may be stored in the same size of spring or weight of spring material than has been possible with springs of the constructions heretofore in use.

Figs. 4 and 5 show the plates of a group of plates in the fully compressed condition of the spring, and if every plate is subjected to its maximum tensile and compressive stresses in two directions at right angles to each other, this dual direction of stresses is equivalent to a uniform stressing of each plate in all directions of its plane, so that a uniform as well as a maximum degree of spring action will be simultaneously obtained.

Figs. 1 to 5, inclusive, show a spring composed of plate members of oblong rectangular form in plan, but, of course, the plate members may be of square form in plan, or of other angular form in plan, or they may be of circular form, as shown for example in the embodiments illustrated in Figs. 6 to 11, inclusive, of the drawings.

Figs. 6, 7 and 8 show tension plates 1$^a$ and compression plates 2$^a$ of circular form and having concentric corrugation forming ribs or ridges 3$^a$ and 4$^a$ respectively, the pitch of the inclined faces of the ribs of the tension plates being slightly less than that of the ribs of the compression plates. Fig. 7 shows the spring in a relaxed state in which the inclined faces of the engaging outer ribs of the plates only are in contact and the apices of the ridge being out of register with each other. As the spring structure is gradually compressed, the ribs will gradually begin to register and the tension plates will stretch uniformly in all transverse directions until the fully compressed condition is obtained, as shown in Fig. 8, while during such action the compression plates will be subjected to compression stresses in all transversal directions. When the fully compressed condition of the plates is obtained, as shown in Fig. 8, the tension plates will be subjected to maximum tensile stresses and the compression plates to maximum compression stresses in all transversal directions.

Intead of employing concentric corrugations and ribs, as shown in Fig. 6, it is obviously possible to use spiral shaped corrugations and ribs, as shown in Fig. 9, which here represent a compression plate 1$^b$, one of the spiral ribs 4$^b$ of which is shown. It is also possible to use other shapes of corrugations and ribs without departing from the spirit of my invention.

As shown in Figs. 1 to 8, inclusive, the spring plates may be of comparatively heavy or thick type, and employing corrugations of a depth smaller than the thickness of the plate, but it is, however, perfectly feasible and generally preferable to use plates which are much thinner than the corrugations. Such a design is shown in Figs. 10 and 11 in which 1$^c$ represents the tension plates and 2$^c$ the compression plates which may be of rectangular, oblong rectangular, circular or other suitable form in plan, and in which the corrugations are formed by ribs or ridges 3$^c$ and 4$^c$, and such corrugations or ribs may be straight, as shown in Figs. 1 to 5, inclusive, or circular and concentric as shown in Figs. 6 to 8, inclusive, or spirally arranged, as shown in Fig. 9.

Figs. 10 and 11 show the use of spiral corrugations and ribs, of a shape similar to those shown in Figs. 6, 7 and 8. The contour of the tension plate 1$^c$ here is substantially the same as that of the compression plate 2$^c$, but the depth as well as the pitch of the ridges of the tension plates are slightly less than those of the compression plates. Fig. 10 shows this spring structure in the relaxed state and Fig. 11 the spring structure in the compressed state. As the spring structure is gradually compressed from the state shown in Fig. 10 to that shown in Fig. 11, the wedging action will cause the tension plates to stretch and the compression plates to contract in circumferential direction. Due to the fact that the sides of the corrugations of the tension plates are smaller than those of the compression plates, the former will also stretch and the latter will also contract in the direction of the genera of the cone-shaped surfaces of the spring elements. Each plate element will therefore, in the fully compressed condition of the spring as shown in Fig. 11, be subjected to tensile stresses as well as to compression stresses, in the two directions perpendicular to the conical surfaces of its corrugations.

Having thus fully described my invention, I claim:—

1. A friction spring device of the character set forth, comprising a plurality of superimposed plates provided with interengaging inclined friction surfaces arranged to produce duo-directional tension and compression stresses in said elements when the spring device is compressed.

2. A friction spring device, according to claim 1, in which the means for producing the duo-directional compression and tension stresses comprises corrugated surfaces on said elements, the surface corrugations of each element being staggered in relation to the coacting ones of the adjacent element when the spring device is relaxed, the surface corrugations of adjacent elements registering when the spring device is fully compressed.

3. A friction spring device, according to claim 1, in which each spring element is provided with prismatically shaped surface corrugations on both sides, the corrugations on one side being perpendicular to those on the opposite side of the same plate.

4. A friction spring device, according to claim 1, in which each spring element is provided with concentric ridge-shaped corrugations of substantially triangular cross-section.

5. A friction spring device, according to claim 1, in which each spring element comprises a plate provided with ridge-shaped corrugations of substantially triangular cross-section.

6. A friction spring, according to claim 1, in which the spring elements consist of plates having corrugations, the corrugations of the plates consisting of concentric ridges of substantially triangular cross-section.

7. A friction spring, according to claim 1, in which the corrugations of the plate-shaped members consist of a spiral of a ridge of substantially triangular cross-section.

8. A friction spring device of the character set forth comprising a plurality of superimposed plates having opposed surfaces provided with interengaging projections, the surface of said projections being relatively inclined for producing duo-directional tension and compression stresses in said elements when the spring device is compressed.

9. A friction spring device of the character set forth, comprising a plurality of superimposed plates having interengaged inclined friction surfaces out of complete registration when the spring is relaxed and relatively sliding toward complete registration as the spring is compressed, said surfaces being arranged to produce tension and compression in said plates in a plurality of angularly disposed directions as the surfaces slide toward full registrating relation.

10. A friction spring device of the character set forth, comprising alternately arranged tension and compression members having interengaging inclined faces sliding toward fully registering relation as the spring is compressed, said inclined faces of individual members being angularly arranged with respect to each other to accomplish tension and compression in a plurality of angularly disposed directions.

OSCAR R. WIKANDER.